United States Patent [19]

Rothbühr et al.

[11] 4,238,199
[45] Dec. 9, 1980

[54] PROCESS FOR THE CONTROL OF THE RATIO DBP NUMBER/DBP NUMBER AFTER PRESSING IN THE MANUFACTURE OF CARBON BLACK PELLETS

[75] Inventors: Lothar Rothbühr, Hürth-Hermühlheim; Werner Sroka, Brühl; Karl Vogel, Bad Vilbel, all of Fed. Rep. of Germany

[73] Assignee: Deutsche Gold- und Silber-Scheideanstalt vormals Roessler, Frankfurt am Main, Fed. Rep. of Germany

[21] Appl. No.: 62,206

[22] Filed: Jul. 30, 1979

Related U.S. Application Data

[63] Continuation of Ser. No. 862,789, Dec. 21, 1977, abandoned.

[30] Foreign Application Priority Data

Jan. 26, 1977 [DE] Fed. Rep. of Germany ....... 2703016

[51] Int. Cl.$^3$ ................................ C01B 3/14; 425 222
[52] U.S. Cl. ....................................... 23/314; 264/117
[58] Field of Search ........................ 23/314; 264/117; 423/460, 461; 73/73

[56] References Cited

U.S. PATENT DOCUMENTS

| | | | |
|---|---|---|---|
| 2,131,686 | 9/1938 | Heller et al. | 23/314 |
| 2,844,445 | 7/1955 | Webster | 23/314 |
| 3,636,148 | 1/1972 | Slagel | 23/314 |
| 3,776,750 | 12/1973 | Mills | 23/314 |
| 3,956,445 | 5/1976 | Hunt | 264/117 |
| 4,005,170 | 1/1977 | Harris | 264/117 |

*Primary Examiner*—Hiram H. Bernstein
*Attorney, Agent, or Firm*—Beveridge, DeGrandi, Kline 6 Lunsford

[57] ABSTRACT

A process for controlling the ratio:

DBP NUMBER/DBP NUMBER AFTER PRESSING for carbon black pellets comprising mixing the carbon black with water and forming the carbon black and water mixture into pellets by means of a wet pelletizing machine, selectively controlling the rotating shaft speed of the pelletizing machine and the amount of water and the location of water injected into the pelletizing machine; and subsequently drying the wet carbon black.

3 Claims, 1 Drawing Figure

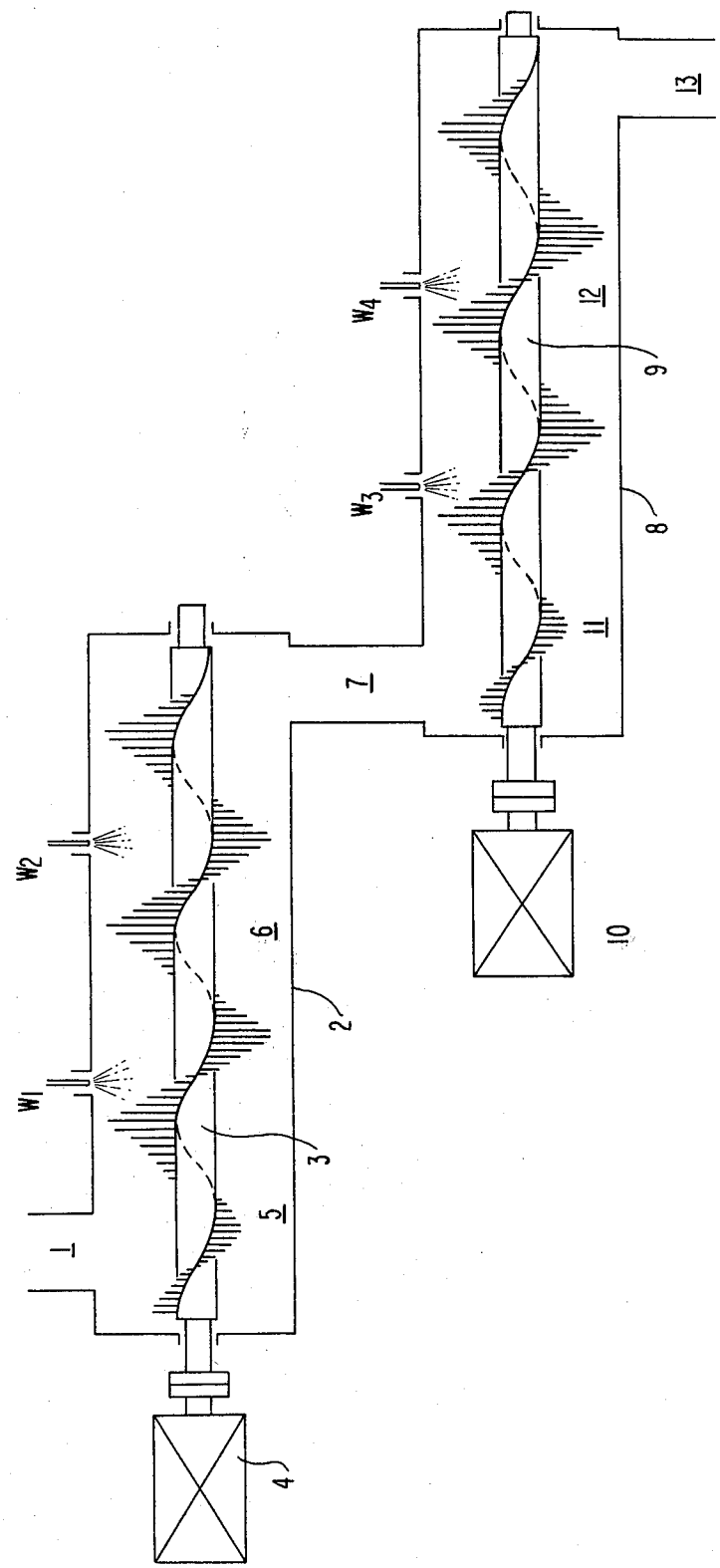

PROCESS FOR THE CONTROL OF THE RATIO DBP NUMBER/DBP NUMBER AFTER PRESSING IN THE MANUFACTURE OF CARBON BLACK PELLETS

This is a continuation of application Ser. No. 862,789 filed Dec. 21, 1977 and now abandoned.

The present invention relates to a process for the control of the ratio DBP NUMBER/DBP NUMBER AFTER PRESSING in the manufacture black pellets.

Carbon blacks are amorphous forms of carbon and are produced according to known production processes, such as the lamp black process, channel black process, gas carbon process and furnace black process. The quality of the carbon blacks is determined essentially by various properties and structure of the carbon black including the primary particle size and surface area, the surface quality (oxygen containing groups, unsaturated groups, content of extract). These are matters well understood in the art as may be seen by reference to a standard text on the subject.

By structure of the carbon black, it is understood that the carbon black may appear as primary particles or agglomerated into grape shaped or spiral shaped formations. Cross linking between particles may take place and result in a genuine growing together during the production of the carbon black as well as in a loose aggregation.

In the case of a few carbon black production processes, for example, in the channel black or the gas carbon process, the developing structure of the final product is determined by the process without there being any chance of influencing the structure by a change in the process. In the case of the production of furnace carbon blacks, however, it is possible to affect the structure of the carbon black by (1) a change in the starting materials used in the carbon black production (see German Pat. No. 1,592,864; German Pat. No. 1,592,863) or (2) by the addition of additives (see German Pat. No. 1,220,540). On the basis of these factors, it has been known to produce a very extensive range of types of carbon blacks according to the furnace carbon black process, which types always show narrowly limited ranges of the structure. Thus, it is possible to adapt the quality of the carbon black to meet the very different requirements in the technological fields of rubber, printing inks, and plastics, to name only a few.

It is essential for the production of a predetermined and selected quality of carbon black that control be exerted over the carbon black obtained in the production process. The development of the structure by cross linking of the primary carbon black particles may be optically determined by the electron microscope. However, to make electron microscopic pictures and to use them is a very time consuming and costly operation. Therefore, this method is unsuitable for the direction and control of carbon black production.

For some time more simple methods have been known to determine the structure of the carbon black. For instance, manual determination by the absorption of oil has been used. In this method, the carbon black is reacted with oil, drop by drop, for a determined length of time and at the same time is ground with a spatula until a paste of a predetermined consistency develops. It is also possible, to shake carbon black in an Erlenmeyer flask for reaction with oil until a single agglomerate develops. However, these methods are dependent upon the individual running the tests and are not sufficiently precise.

A more precise method which is now used for the determination of the structure and type of carbon black is the determination of the dibutylphthalate absorption number according to the ASTM regulation D 2414-76, which regulation is relied on herein and incorporated herein by reference. This method of determination is based on a procedure wherein dibutylphthalate is dropped from a burette onto a weighed quantity of carbon black which is in a kneader, until a steep rise in required mixing force takes place in the kneader. The value obtained by this test which is known in the art as the DPB number in the case of a marketable, commercial carbon black, ranges between 40 and 200 ml DBP/100 g. of carbon black. DBP numbers have now found their way into various specifications for consumers and producers of carbon black because the DBP number is considered a measured determination which provides reliable and accurate information on the processability and dispersibility of carbon black.

More recently, however, it has been pointed out that the "standard DBP number" is said to contain a portion which is not decomposable (primary structure) and a portion which is decomposable (secondary structure). The primary structure is a good measure for the prediction of rubber technical data. The DBP number after pressing has been mentioned as a test method.

The DBP number after pressing is determined as follows:

Into a steel cylinder having a diameter of 32 mm there is inserted 25 g. of carbon black. A load is then applied to the carbon black via a punch (plunger) having a pressure of 13.5 tons, corresponding to 1700 kg/cm$^2$. After about 5 seconds, the sample is removed from the pressing apparatus and is comminuted in a porcelain mortar. The pressing process inclusive of comminution is repeated three more times. Subsequently, the DBP number is determined in the material thus pretreated according to ASTM-D-2414-76 which is incorporated herein by reference.

In the case of standard commercial carbon black, the DBP number after pressing is in the range of 35 to 130 ml. DBP/100 g. of carbon black; that is, lower than the standard or normal DBP number.

Rubber processors specify the DBP number of pellet carbon black for use in rubber as well as the DBP number after pressing, because some persons in the industry are of the opinion that the two numbers contain absolutely different data. However, the general rule prevails that carbon black with a high DBP number will also result in carbon black with a high DBP number after pressing, however, the relationship, DBP/DBP after pressing, is desired to be distinguishable from the individual values of DBP and DBP after pressing.

The object of the invention is to develop a process with which the ratio DBP number/DBP number after pressing may be controllably changed in the case of pellet carbon blacks in any desired direction.

It is a further object of the invention to provide a process for controllably changing the ratio DBP number/DBP number after pressing in any desired direction in the case of carbon black pellets which is characterized by the fact that carbon black is continuously mixed with water by means of a wet pelletizing machine (Nassperlmaschine) and is made into pellets or beads.

The above objects are attained according to the invention which resides in a process for controlling the properties of carbon blacks by bringing about a change in the ratio DBP number/DBP number after pressing, comprising continuously mixing the carbon black and water into pellets by means of a wet pelletizing machine. According to the invention, for the achievement of a low value for the ratio DBP number/DBP number after pressing, the control is accomplished by setting the speed of the rotating shaft of the wet pelletizing machine at a high rate and/or by adding the main quantity of water at a position for the injection of water located upstream or in the first section of the machine; and for the achievement of a high value for the ratio DBP number/DBP number after pressing, the control is accomplished by setting the speed of the rotating shaft of the wet pelletizing machine at a low rate and/or by adding the main quantity of water at a place for the injection of water location downstream or in the second section of the machine. Subsequently, the wet pellet carbon black is dried. As will be apparent to those persons skilled in the art the rotating shaft in each of the troughs or sections has attached thereto a series of pins which are wound around the shaft in a helical or spiral configuration. The pins extend in a direction 90° to the axis of the shaft and the height of the pins varies from long pins to relatively short pins depending on the location on the shaft.

BRIEF DESCRIPTION OF THE DRAWINGS

The drawing depicts a schematic representation of a pelletizing machine used in accordance with the invention.

In accordance with a more detailed aspect of the claimed invention, in order to achieve a low value for the ratio DBP number/DBP number after pressing the speed of at least one rotating shaft of the wet pelletizing machine is set at a high rate of rpm, generally more than 400 rpm, and/or the main volume of water is sprayed into an injection port in an upstream position in the first trough or section of a wet pelletizing machine. For achieving a high value for the ratio DBP number/DBP number after pressing the rotational speed of the rotating shaft of the wet pelletizing machine is set at a low rate of rpm, generally less than 400 rpm, and/or the main volume of water used for injection is sprayed into an injection port located downstream and in the second trough or section of said machine. Thereafter the wet pelletized carbon black is dried.

The present invention will be further understood by reference to the accompanying drawing, which is a schematic elevational view of the apparatus of the invention showing the shaft with mixing means and inlet locations or ports.

The process of the invention may be independent of the specific type of wet pelletizing machine used. These pellet or bead forming machines may have diameters of any convenient size and may differ in form and design of the arrangement of the pins. The number of stages of the pellet forming machine is not limited by the process. Thus, one may use pellet machines with 1 to 4 stages. The arrangement of the pellet machine troughs or passages may be horizontal or vertical.

The shifting of the stages for the injection of water may take place either through relocation of the water injection arrangement or as a result of the fact that basically two water injection places are used and are acted upon with variable quantities of water. In summary, the process of the invention may be determined by three variable factors:

1. adjustment of speed of the shafts of the wet pellet machines;
2. position of the location for injection of water; and
3. distribution of the quantity of water to the locations for injection of water.

Insofar as a high ratio DBP number/DBP number after pressing is to be achieved, low speeds may be adjusted on the pellet machine and the addition of water may take place by means of an injection device at a place located downstream; i.e. in the second stage, or after passing through the first stage and being acted on by the first rotating shaft. In the case of the use of two places of the injection of water, the overwhelming part of the water must be injected in a downstream location (second stage). By low speed, we intend to mean a speed of less than 400 rpm, commonly between 200 and 350 rpm.

On the other hand, insofar as a low ratio of DBP number/DBP number after pressing is desired to be obtained, high speeds of the shafts of the pellet machines may be used and the addition of water may take place by means of an injection apparatus at a place upstream; i.e. in the first stage, or while passing through the first stage and while the carbon black is being acted on by the first rotating shaft. In the case of the two places for water injection, the overwhelming part of the water must be sprayed in at a place upstream (first stage). By high speeds, we intend to mean shaft rotational speeds exceeding 400 rpm, usually between 400 and 700 rpm.

The quantity of water per time unit; i.e. the addition of water, is always adjusted such that the optically most favorable pellets will develop. The best adjustment for the addition of water exists, whenever the pellet carbon black emerging from the pellet machine does contain either unwetted soot dust (resulting from a too dry adjustment) or sticky agglomerates or aggregates resulting from too wet an adjustment. The examples which are contained herein show total water injection rates of from 420 liters per hour to 530 liters per hour. When the total water quantity is divided the examples show that from 200 to 245 liters per hour is added in the first section and from 245 to 330 liters per hour are added in the second section. These rates are based on the feed rate of carbon black of 420 kg/hour.

A particularly advantageous embodiment of the invention resides in locating the variable feed in of water at two points of the pellet machine which lie considerably far apart, for example, one in the first section and the other in the second section. In this embodiment, specially high quality carbon black pellets are obtained. An additional advantage resides in the fact that without a change of the gear mechanism and of water nozzles and merely by variation of the feed-in quantities at the injection places located upstream or downstream, a relatively wide and desired control of the ratio DBP number/DBP number after pressing may be achieved. According to the invention, it is not absolutely necessary to use only two individual feed-in ports, and hence even more than two feed-in ports or even groups of nozzles may be used.

The invention is illustrated in more detail by the following examples. The ratio of water to carbon black in these examples ranges from 1 liter/hour of water per kg. of carbon black to approximately 1.26 liters/hour of water per kg. of carbon black.

EXAMPLE 1

For these experiments, a carbon black produced according to the furnace carbon black process with the following physical-chemical characteristic data is used: Iodine absorption according to DIN 53 582—93 mg./g. electron microscopically determined diameter of primary particles—25 mµ
pH value—9

The carbon black in pellet form is to attain a DBP number of 113-116 ml./100 g. Slight corrections of the DBP number of the powder carbon black entering the pelletizing process were made here by the addition of additives in the reactor. The carbon black produced in this way is wet pelletized in a pellet forming machine of a conventional construction.

Turning to the drawing, the configuration shown is a schematic representation of a pelletizing machine. The carbon black is fed in by the short feed pipe 1 into the first section 2 of the pellet forming machine. Shaft 3 of the first section 2 is driven by motor 4. On shaft 3 in area 5 near the point where the carbon black is introduced, there are short pins. In area 6 on the shaft 3 there are long pins which are spirally wound around the shaft. After passage through the first section 2, the carbon black falls through the connecting pipe or passageway 7 into the second and subsequent section 8 which basically has the same construction as the first section 2. That is to say, in the second section 8 the shaft 9 is driven by motor 10. On the shaft 9 in area 11, there are short pins, while in area 12, long pins are located in a spiral winding about the shaft. The inside diameter of the two sections, which may be called pellet troughs, is 512 mm. The finished pellet carbon black leaves the pellet machine through the exit pipe 13. The pellet machine used is provided with four locations or ports for spraying in water noted as W1, W2, W3 and W4 and may be evenly distributed over the entire length. These ports may be operated individually or together.

Using equipment as shown in the drawing, 420 kg./hour of fluffy carbon black with a DBP number of 122 ml./100 g. are fed continuously to the pellet machine having two sections or troughs. The shaft speed in the first section is 640 rpm. The shaft speed in the second section is adjusted to 300 rpm. 420 liters/hour of water are then fed into the first section via the first entry port W1 for injection of water. After leaving the pellet machine, the carbon black is dried in a drum drier at a temperature of 160° C.

The DBP number and the DBP number after pressing are determined in the dried carbon black.
DBP number—114 ml./100 g.
DBP number after pressing—100 ml./100 g.
ratio: DBP number/DBP number after pressing=1.140
difference: DBP number-DBP number after pressing=14 ml./100 g.

EXAMPLE 2

The pellet machine according to Example 1 is used. The speed of the first section is adjusted to 350 rpm, that of the second section to 300 rpm. 420 kg./hour of fluffy carbon black with DBP number of 121 ml./100 g. is fed into the first section. 455 l./hour of water are added by way of the entry port W1 in the first section for injection of water. After drying of the wet pellets in a drum drier at 160° C., the DBP number and the DBP number after pressing are determined in the dry pellet carbon black.

DBP number—113 ml./100 g.
DBP number after pressing—98 ml./100 g.
ratio: DBP number/DBP number after pressing=1.153
difference: DBP number—DBP number after pressing=15 ml./100 g.

EXAMPLE 3

A pellet machine according to Example 1 was used and the speed of the shaft in the first section is adjusted to 350 rpm and the speed of the shaft in the second section is adjusted to 300 rpm. 420 kg/hour of fluffy carbon black with a DBP number of 119 ml./100 g. are inserted. In addition, 245 l./hour of water are inserted at the second entry port W2 in the first section for the injection of water and 245 l/hour of water at the position W3, the first entry port in the second section for the injection of water.

After drying of the pelletized carbon black thus obtained in a drum drier at 160° C., the DBP number and the DBP number after pressing are determined.
DBP number 114 ml./100 g.
DBP number after pressing 97 ml./100 g.
ratio: DBP number/DBP number after pressing=1.175
difference: DBP number-DBP number after pressing=17 ml./100 g.

EXAMPLE 4

The pellet machine according to Example 1 is used. The speed is adjusted to 350 rpm for the first section and to 300 rpm for the second section. The addition of water is accomplished at the positions W2 and W3 for the injection of water in a ratio of 38:62. 420 kg/hour of fluffy carbon black with a DBP number of 118 ml./100 g. are fed in continuously. The addition of water amounts to 200 l./hour at the position W2 for the injection of water and 330 l./hour of water at the position W3 for the injection of water. After drying of the pelletized carbon black thus obtained in a drum drier at 160° C., the DBP number and the DBP number after pressing are determined.
DBP number—116 ml./100 g.
DBP number after pressing—96 ml./100 g.
ratio: DBP number/DBP number after pressing=1.208
difference: DBP number-DBP number after pressing=20 ml./100 g.

The results obtained in the preceding example are compared in the table.

TABLE I

| Example | Speed First Section | Speed Second Section | Position for Injection of water W1 | Position for Injection of water W2 | Position for Injection of water W3 | ratio DBP number/DBP number after pressing |
| --- | --- | --- | --- | --- | --- | --- |
| 1 | 640 | 300 | 420 | — | — | 1.140 |
| 2 | 350 | 300 | 455 | — | — | 1.153 |
| 3 | 350 | 300 | — | 245 | 245 | 1.175 |
| 4 | 350 | 300 | — | 200 | 330 | 1.208 |

Further variations and embodiments of the invention will be apparent to those skilled in the art.

We claim:
1. A process for controlling the properties of carbon blacks by bringing about a change in the ratio of DBP number/DBP number after pressing comprising:
continuously mixing dry powdered carbon black with water and forming the carbon black and water into pellets by means of a wet pelletizing machine; said machine having at least two sections each section having therein a rotating shaft with spines spirally wound around said shaft and equipped with at least one water entry port in each section, the dry carbon black being added in the first section only and a portion of the water being injected into each of at least two sections of said machine and wherein to obtain a low value for the ratio DBP number/DBP number after pressing, the speed of the rotating shaft of the pellet machine is set at a high rate relative to the speed of the shaft in the second portion and/or the major portion of water is added at a position for the injection of water located in the first section of the machine and wherein to obtain a high value for the ratio DBP number/DBP number after pressing, the speed of the rotating shaft of the pellet machine is set at a low rate relative to the second section and/or the major portion of water is added at a place for the injection of water lying in the second section of the machine; and wherein the wet carbon black pellets are subsequently dried.

2. The process as defined in claim 1 wherein the rotating shaft operating at the relatively higher rate operates at least at 400 rpm and the rotating shaft operating at the relatively lower rate operates at less than 400 rpm.

3. The process as defined in claim 2 wherein the range of means shaft rotational speeds for the shaft operating at relatively high speed in between 400 and 700 rpm and the range of mean shaft rotational speeds for the shaft operating at relatively low speed is 200 to 350 rpm.

* * * * *